United States Patent [19]
Vaclavik et al.

[11] Patent Number: 6,094,480
[45] Date of Patent: Jul. 25, 2000

[54] RING TRIP DETECTOR

[75] Inventors: Peter Vaclavik; Tsuyoshi Ueshima; Serdar Kiykioglu, all of Plano; Mark Bolla, Richardson, all of Tex.

[73] Assignee: Fujitsu Network Communications, Inc., Richardson, Tex.

[21] Appl. No.: 08/883,482

[22] Filed: Jun. 26, 1997

[51] Int. Cl.$^7$ ...................................................... H04M 1/00
[52] U.S. Cl. ........................................... 379/377; 379/373
[58] Field of Search .................................... 379/377, 382, 379/373, 164; 377/382

[56] References Cited

U.S. PATENT DOCUMENTS

| | | | |
|---|---|---|---|
| 3,766,325 | 10/1973 | Hatfield et al. | 379/373 |
| 3,941,939 | 3/1976 | Holmes et al. . | |
| 4,289,933 | 9/1981 | Henry . | |
| 4,473,719 | 9/1984 | Embree et al. . | |
| 4,731,828 | 3/1988 | Basehore . | |
| 4,995,111 | 2/1991 | Tojo et al. . | |
| 5,335,271 | 8/1994 | Takato et al. . | |
| 5,422,947 | 6/1995 | Azem | 379/164 |
| 5,446,786 | 8/1995 | Shtulman | 379/164 |
| 5,712,910 | 1/1998 | Saito | 379/373 |

*Primary Examiner*—Dwayne D. Bost
*Assistant Examiner*—Myron K. Wyche
*Attorney, Agent, or Firm*—Staas & Halsey LLP

[57] ABSTRACT

A ring trip detector has a voltage difference detector with first and second inputs, for supplying an off-hook signal upon detection of a voltage difference. The ring trip detector also has a switch extending between the first and second inputs of the voltage difference detector. The ring trip detector detects when a telephone current starts to flow through a sensing resistor having first and second ends and to a telephone set. The switch closes upon an initial current flow through the sensing resistor and then opens. The ring trip detector has a pulse generating mechanism having two inputs respectively connected to the first and second ends of the sensing resistor. The pulse generating mechanism has an output and generates a pulse at the output when current starts to flow through the sensing resistor. The switch has a trigger connected to the output of the pulse generating mechanism for closing the switch when the pulse is generated. A differentiator mechanism may be used as the pulse generating mechanism. Such a differentiator mechanism may have a resistor and a capacitor connected in series between the first end of the sensing resistor and the trigger of the switch, and a resistor connected between the second input of the voltage difference detector and the trigger of the switch. Alternatively, a differentiator/integrator mechanism may be used as the pulse generating mechanism.

14 Claims, 4 Drawing Sheets

RING TRIP DETECTOR

BACKGROUND OF THE INVENTION

1. Field of the Invention

The present invention relates in general to a ring trip detector for a subscriber telephone line, by which an on-hook state or an off-hook state of the telephone line is detected. More particularly, the present invention relates to an improved ring trip detector which avoids false alarms and quickly detects the off-hook state, regardless of variations in subscriber equipment or loop lengths.

2. Description of the Related Art

To alert telephone subscribers to a telephone call, telephone sets are equipped with a calling device (a bell or other acoustic transducer) which is responsive to an alternating current electric calling signal applied to the subscriber's line at the telephone exchange. At the same time the called party receives the calling signal, the calling party receives tones indicating that the call has been switched through.

When the called party answers the telephone set, it is necessary for the calling signal to be removed from the called party's line, preferably near instantaneously, to avoid an intense sound being emitted from the telephone transducer. Also, the tones indicating a call must be removed from the calling party's line to indicate that the called party has answered.

Removal of the calling signal and tones indicating a call from the lines is known as "ring trip," and ring trip detection determines when removal should take place. Recently, stringent requirements have been placed on ring trip detectors. Ring trip detectors must detect an off-hook state (when the telephone set is answered) within a short period of time, for example 200 ms. The ring trip detector must also be immune to other line conditions, such as off-hooks and other power spikes, which occur for less than 12 ms. Ring trip detectors must consistently meet these conditions regardless of whether the "loop" connecting the subscriber's telephone is short and has a low resistance or is long and has a high resistance. The loop resistance may be as great as 2,000Ω. Further, ring trip detectors must pass a test to ensure that the ring trip detector will avoid erroneous ring trips, in which an 8 μF capacitor and a 10 kΩ resistor are substituted in parallel for the subscriber's telephone set. In this test, a ring trip must not be detected.

In telephone switching systems, line cards serve as the interface between outside lines and switching equipment. The line cards may be provided at the central office or at intermediate equipment, such as a digital loop carrier, which conveys the line traffic to the central office. The line cards contain ring trip detectors thereon. A large number of lines may be interfaced at a single location. For example, there may be 20,000 line interfaces and hence 20,000 ring trip detectors at a single location. Because of the great number of ring trip detectors and line cards necessary in switching equipment, the line cards and ring trip detectors are very cost sensitive pieces of equipment. Even a few cents difference in the cost of switch card components must be weighed against the resulting overall great increase to the total cost.

SUMMARY OF THE INVENTION

Accordingly, it is an objection of the present invention to detect ring trips in a short period of time and avoid false ring trips, regardless of variations in loop or equipment characteristics.

It is a further object of the present invention to provide an improved ring trip detector which minimizes the number of additional components.

It is a yet further object of the present invention to provide an improved ring trip detector which can use low cost components.

These and other objects of the invention are satisfied by providing a ring trip detector having a voltage difference detector with first and second inputs, for supplying an off-hook signal upon detection of a voltage difference. The ring trip detector also has a switch (which may be a transistor) extending between the first and second inputs of the voltage difference detector. The ring trip detector detects when a telephone current starts to flow through a sensing resistor having first and second ends and to a telephone set. The switch closes upon an initial current flow through the sensing resistor and then opens.

The ring trip detector has a pulse generating mechanism having two inputs connected respectively to the first and second ends of the sensing resistor. The pulse generating mechanism has an output and generates a pulse at the output when current starts to flow through the sensing resistor. The switch has a trigger connected to the output of the pulse generating mechanism for closing the switch when the pulse is generated.

A differentiator mechanism may be used as the pulse generating mechanism. Such a differentiator mechanism may have a resistor and a capacitor connected in series between the first end of the sensing resistor and the trigger of the switch, and a resistor connected between the second input of the voltage difference detector and the trigger of the switch.

Alternatively, a differentiator/integrator mechanism may be used as the pulse generating mechanism. That is, an integrator mechanism may be connected in series with the differentiator mechanism, between the output of the differentiator and the trigger of the switch. Such a differentiator/integrator mechanism may have a resistor and a capacitor connected in parallel between the trigger of the switch and the second input of the voltage difference detector, a diode having first and second ends with the first end connected to the trigger of the switch, a resistor connected between the second end of the diode and the second input of the voltage difference detector, and a resistor and a capacitor connected in series between the first end of the sensing resistor and the second end of the diode.

The voltage difference detector may be formed of a comparator having first and second inputs, and a pair of R-C filtering elements, each connected to one input of the comparator and one input of the voltage difference detector.

BRIEF DESCRIPTION OF THE DRAWINGS

The invention will be readily understood by reference to the following description of specific embodiments described by way of example only, with reference to the accompanying drawings in which like reference characters represent like elements, wherein.

DETAILED DESCRIPTION OF THE PREFERRED EMBODIMENTS

Figure 1:
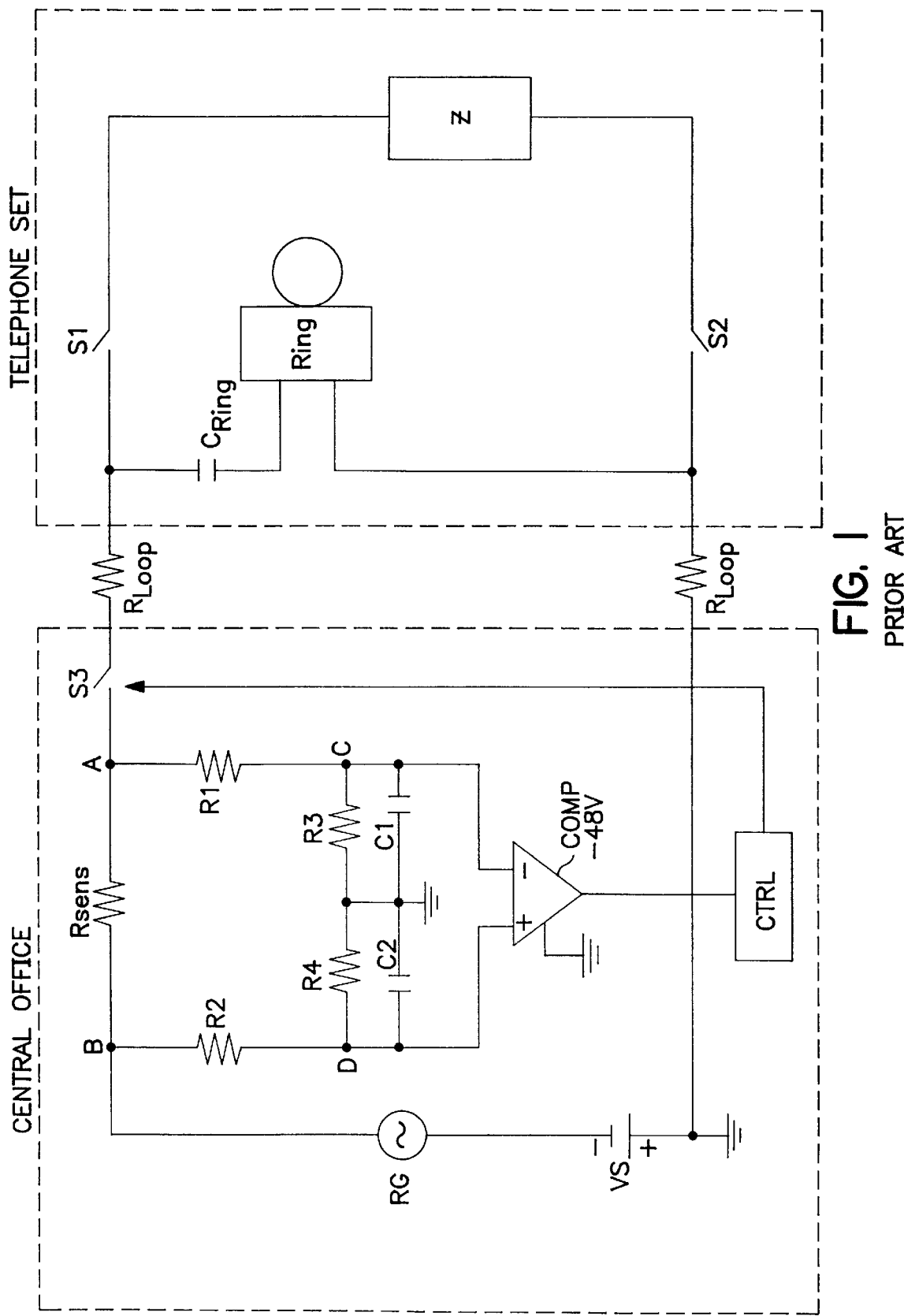
FIG. 1 is a circuit diagram of a conventional ring trip detector as used with loop lines and a telephone set.

FIG. 1 is a circuit diagram of a conventional ring trip detector as used with loop lines and a telephone set. The circuit diagram of FIG. 1 is divided into a central office and a telephone set. However, as mentioned previously, a line interface may be at an intermediate piece of equipment, such as a digital loop carrier, rather than at the central office. Further, it should be readily understood that the invention is for use with equipment other than telephone sets, such as answering machines, fax machines, computer modems, etc.

In the telephone set, a ringer always connected to the central office, whereas the remainder of the telephone set is only selectively connected to the central office. The ringer is connected in line with a capacitor $C_{ring}$ which allows an AC source to activate the ringer, but filters out DC sources. The remainder of the telephone set includes resistive and reactive elements and is represented by an impedance Z. When the telephone is on-hook, switch hooks $S_1$ and $S_2$ are open. At this point, only the ringer remains connected.

Loop lines, such as conventional "twisted pair" wires, connect the telephone set and the central office. The loop lines have a loop resistance $R_{loop}$ which varies as discussed above. On the central office side, a ringing generator current source RG is connected in series with a DC battery voltage source VS. The ringing generator RG remains on. When the subscriber is to be alerted to an incoming call, a controller CTRL (usually implemented as a microprocessor) closes switch S3. At this point, the AC current flows through the ringer.

To detect when the telephone set goes off-hook and switches S1 and S2 are closed, a voltage difference detector is provided as the ring trip detector. The voltage difference detector includes elements R1, R2, R3, R4, C1, C2 and COMP. Resistors R1 and R3 serve as load side voltage dividers. Resistors R2 and R4 serve as source side voltage dividers. Capacitors C1 and C2 are filtering capacitors. R1, R3 and C1 form one R-C filter; and R2, R4 and C2 form another R-C filter.

The voltage difference detector detects the voltage drop across a sensing resistor $R_{sens}$, between points A and B. To detect the voltage drop, comparator COMP is used. The comparator COMP may be a comparator which operates between 0 and −48 volts. Comparator COMP may be part of an SLIC (Subscriber Line Integrated Circuit) circuit, but is not so restricted.

In the on-hook state, with switches S1 and S2 open, the voltage at point D is more positive than the voltage at point C. Noting the polarity of battery VS, the voltage at point D is initially more positive simply because of the values chosen for the resistors. More specifically, the voltage at point C is equal to the voltage drop across resistor R3 and is equal to the source voltage VS minus the voltage drop across resistors $R_{sens}$ and R1. It should be noted that the resistance of $R_{sens}$ is significantly lower than other resistive values, and the voltage at point C is approximately equal to the source voltage VS minus the voltage drop across resistor R1.

To avoid the influence of AC ring generator RG on the comparison of COMP. filtering capacitors C1 and C2 are provided between points C and D to keep the AC potential the same at points C and D. Despite filtering capacitors C1 and C2, a slight AC voltage will be superimposed on the DC voltage considered by the comparator COMP.

When the subscriber answers and puts the telephone set in an off-hook state, switches S1 and S2 close causing signifi-cantly more current to flow through $R_{sens}$. The current flowing through switches S1 and S2 is referred to herein as a "telephone current." With the resulting change in voltage across $R_{sens}$ and between points C and D, current from voltage source VS will flow through capacitors C1 and C2. That is, as the voltage across $R_{sens}$ changes, DC current is shunted from resistors R3 and R4 though capacitors C1 and C2, respectively. During brief period, the voltage difference between points C and D goes to zero. Then, with an increased voltage drop across $R_{sens}$, the voltage at point C becomes more positive than the voltage at point D. The comparator COMP detects that the polarities have reversed and sends a signal indicating same to controller CTRL. Upon receiving the signal, controller CTRL turns off the ringing generator RG from the line by opening switch S3. At this point DC voltage no longer flows through the path shown in FIG. 1. Instead, the end of switch S3 which is shown in FIG. 1 to be open is connected to other circuitry not shown. This other circuitry supplies power to the telephone set for duration of the telephone call. That is, the circuitry shown in FIG. 1 is only used to initiate the call.

The rate at which the capacitors C1 and C2 charge is dependent upon their respective time constants. The time constant for capacitor C1 is determined by the capacitance of capacitor C1 and the resistance of resistors R3 and R1. Similarly, the time constant for capacitor C2 is determined by the capacitance of capacitor C2 and the resistance of resistors R2 and R4. The time constants for both capacitors C1 and C2 are also influenced by the loop resistance.

With the device shown in FIG. 1, the time constants for capacitors C1 and C2 are chosen such that charging is slow enough to avoid false alarms. For example, the time constants are chosen so that the comparator COMP will not show a reversal in polarity between points C and D until after 12 ms. However, as mentioned above, the resistance of the loop line and attached equipment will influence the time constants. Furthermore, the capacitors C1 and C2 must be large enough to filter out AC components, but small enough to minimize ring trip delay. Also, the resistors R3 and R4 must be large enough to minimize the current draw on voltage source VS by the ring trip detector. With these considerations, the time constants for capacitors C1 and C2 cannot be set freely, and in fact, will vary. The ring trip detector shown in FIG. 1 cannot simultaneously meet all of the current requirements, when taking into account varying loop lengths.

Figure 2:
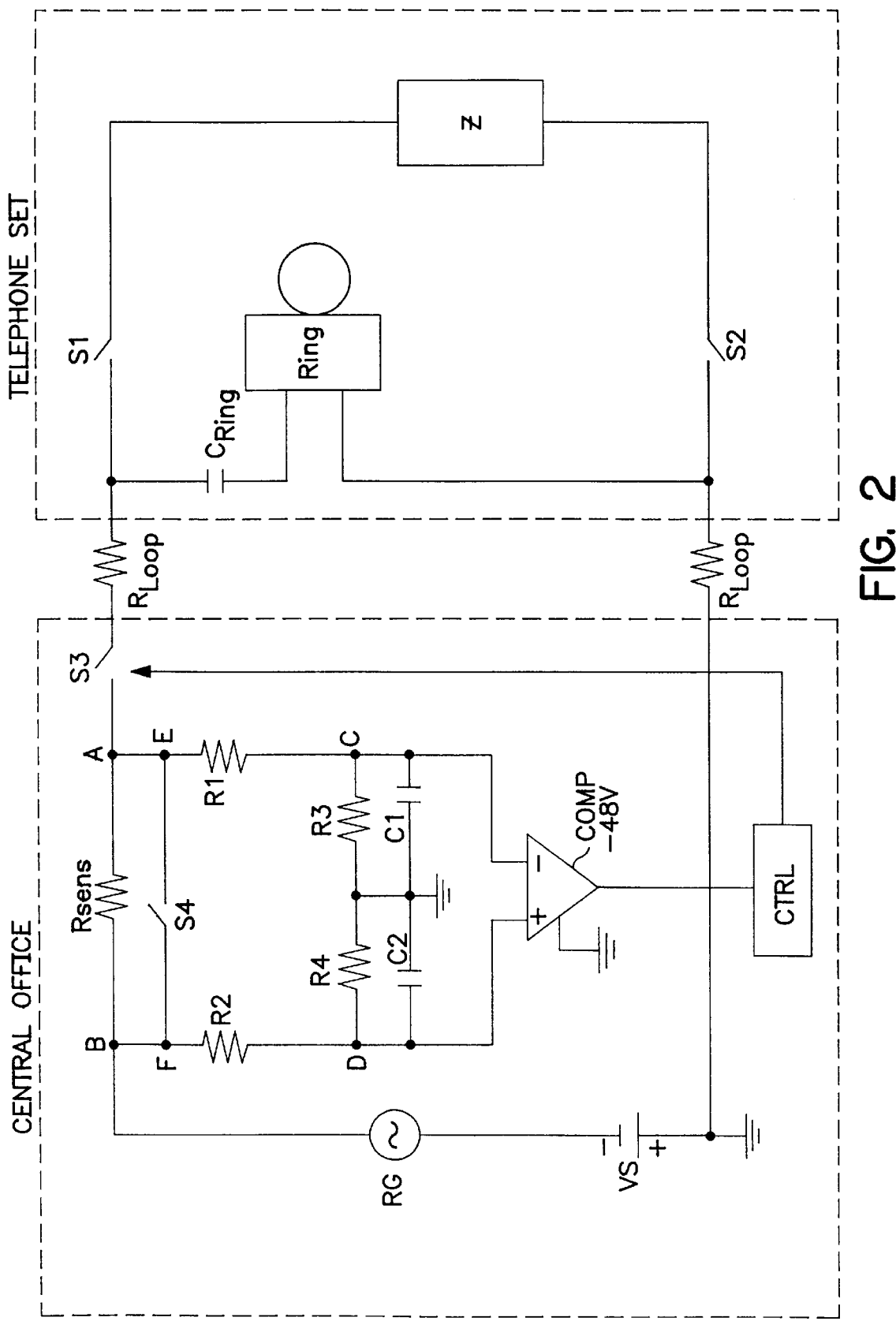
FIG. 2 is a circuit diagram of a ring trip detector as used with loop lines and a telephone set, according to the present invention.

FIG. 2 is a circuit diagram according to the present invention. As can be seen in FIG. 2, a switch 4 extends between the inputs of the voltage difference detector. That is, the switch S4 is connected between points E and F, in parallel with $R_{sens}$. The switch S4 closes when the telephone set is first put in an off-hook state. When closed, there is no potential difference between points E and F. After a short period of time, switch S4 opens, allowing the voltage difference detector to operate as described above. More specifically, the short period of time may correspond to the amount of time necessary to avoid false alarms, for example 12 ms.

Figure 3:
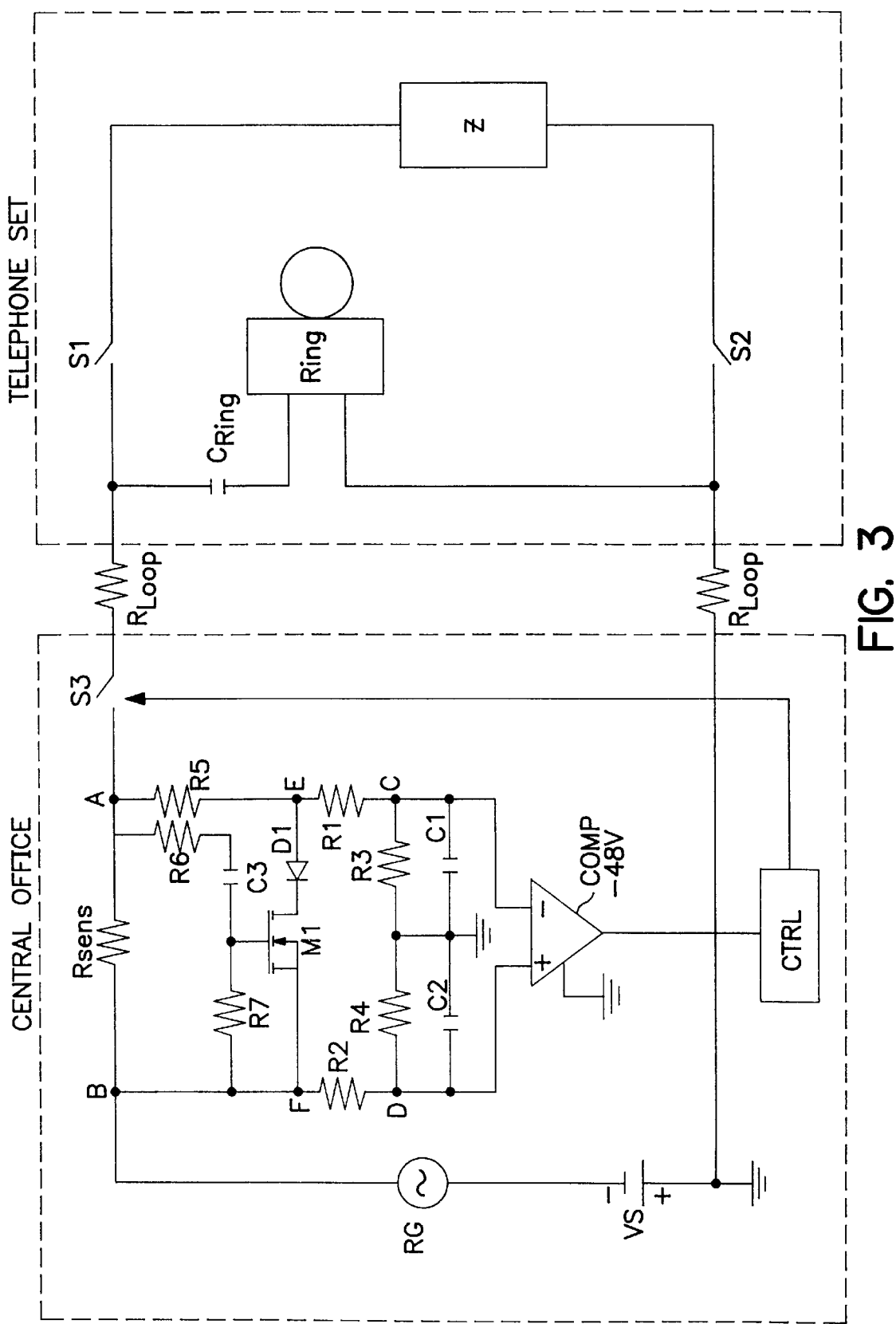
FIG. 3 is a detailed circuit diagram of a ring trip detector as used with loop lines an da telephone set, according to the first embodiment of the present invention.

FIG. 3 is a detailed circuit diagram of a ring trip detector as used with loop lines and a telephone set, according to the first embodiment of the present invention. As shown in FIG. 3, the switch S4 includes elements R5, R6, R7, C3, D1 and M1. In FIG. 3, a MOSFET (enhancement MOSFET) transistor M1 is the actual switching element. However, other transistors, such as bipolar junction transistors, can be used equally as well. Diode D1 serves as a protection diode preventing a negative voltage across the transistor terminal.

Alternatively, a Zenier diode could be provided between the source and drain of transistor M1. Also, if the transistor M1 has a high enough breakdown voltage, a protection element such as a diode or Zenier diode is not necessary. Resistor R5 functions in voltage division for the load side. Note that an additional resistor may be provided between points B and F to ensure that the impedance from point A to ground is the same as that from point B to ground.

As discussed above, when the subscriber off-hooks the telephone set and switches S1 and S2 close, the current flow through $R_{sens}$ significantly increases. With the resulting voltage change across $R_{sens}$, current will initially flow through capacitor C3. More specifically, current will flow through resistor R6, capacitor C3 and resistor R7. This causes a voltage drop across resistor R7 and a potential difference between the gate and source of transistor M1 (positive gate-source voltage). The positive gate source voltage allows current to flow through transistor M1 between points E and F. After capacitor C3 has charged and the DC voltage across Rsens stabilizes, current will not appreciably flow through capacitor C3 or resistor R7. At this point, the positive gate source voltage disappears and current no longer flows between points E and F.

As outlined above, a single pulse in the gate source voltage opens and closes the transistor M1. The circuit of FIG. 3 has one stable state (transistor M1 open) and one unstable state (transistor M1 closed). The circuit of FIG. 3 is thus known as a "monostable circuit." A trigger signal (the single pulse) is required to drive the circuit into the unstable state, where it remains for a predetermined period of time (determined by the time constant of C3) before returning to the stable state. Therefore the circuit of FIG. 3 is more precisely known as a "monostable multivibrator."

In the on-hook state, before a call is received, it is important that transistor M1 remains off. To accomplish this, the Thevinen equivalent impedance at point A should be equal to the Thevinen equivalent impedance at point B.

As can be seen from FIG. 3, the voltage detector components of FIG. 1 remain in the FIG. 3 circuit. However, because the switch extending between points E and F provides a delay, the R-C filters of capacitors C1 and C2 no longer have to do so. Of course, the capacitors C1 and C2 must still filter the A-C component from the comparator COMP and the resistor R4 and R5 must still minimize current draw on voltage source VS.

In the ring trip circuit shown in FIG. 3, resistors R6 and R7 and capacitor C3 act as a differentiator circuit. The time for which the differentiator circuit closes transistor M1 depends the RC time constant, and this time constant depends on resistances of resistors R6 and R7 and the capacitance of capacitor C3. The time constant should be long enough (for example 12 ms) to prevent false ring trips. More expensive resistors and capacitors have very tight tolerances such that the respective resistances and capacitances do not vary from that for which the elements are rated. Although there is an increase cost associated with tight tolerances, the circuit shown in FIG. 3, minimizes the number of additional elements. Furthermore, the time for which transistor M1 stays closed may not require as precise control as described above.

Figure 4:
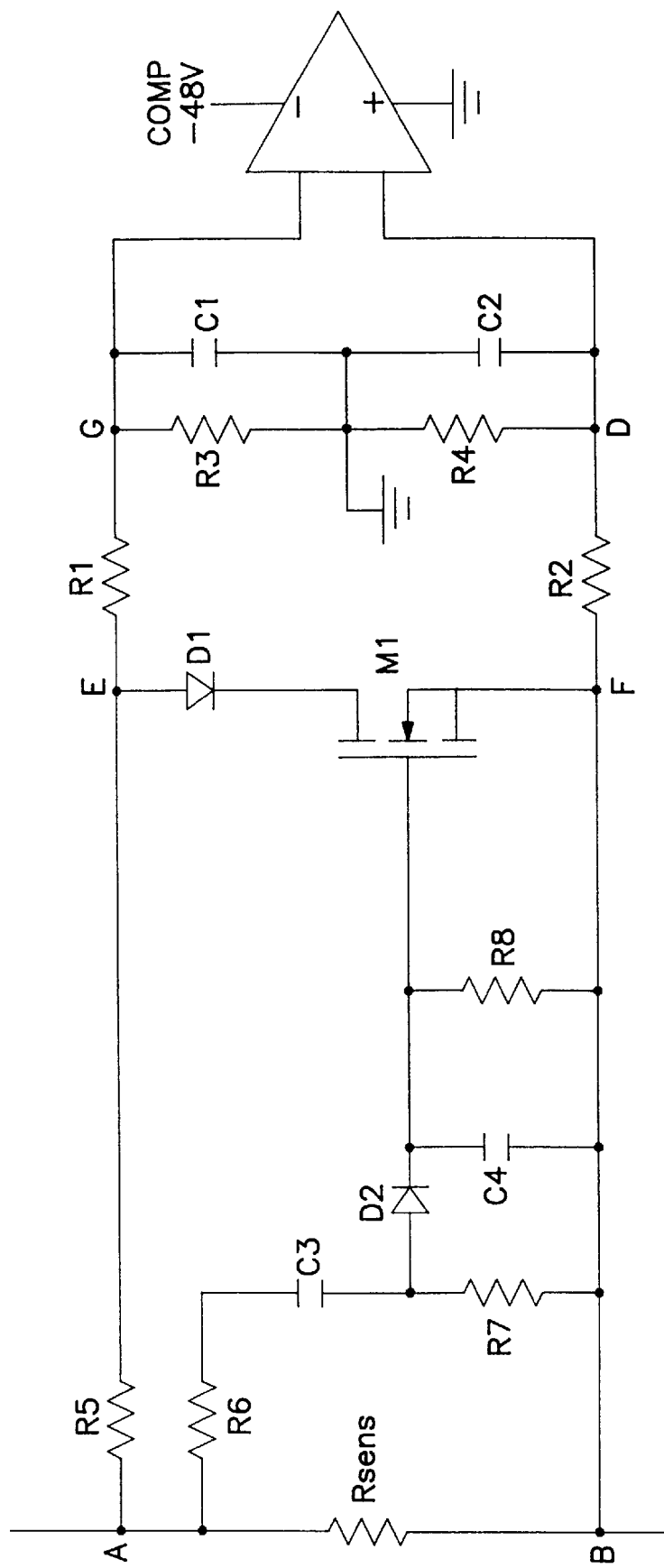
FIG. 4 is a detailed circuit diagram of a ring trip detector according to the second embodiment of the present invention.

The differentiator circuit of FIG. 3 produces a voltage pulse through R7 which has an initial peak and then subsides. According to the second embodiment of the invention, an integrator circuit is provided in series with the differentiator circuit shown in FIG. 3 to provide a more squared off voltage pulse at the input of transistor M1. FIG. 4 is a detailed circuit diagram of a ring trip detector according to the second embodiment of the present invention. FIG. 4 shows only the ring trip detector circuitry, whereas FIGS. 1–3 also show an overview of the central office and telephone set interconnections. The ring trip detector of FIG. 4 is similar to that of FIG. 3 with the exception of the added circuit elements diode D2, capacitor C4 and resistor R8. Circuit elements D2, C4 and R8 serves as the integrator circuit in series with the differentiator circuit formed by elements R6, C3 and R7. With the integrator circuit, it is possible to precisely control the time for which transistor M1 stays closed, even if inexpensive, low tolerance circuit elements are used. In FIG. 4, diode D2 allows the time constant for capacitor C4 to be controlled independently of the circuit elements used in the differentiator. That is, the time constant for capacitor C4 is determined by the capacitance of capacitor C4 and resistance of resistor R8. Capacitor C4 charges quickly, but slightly slower than, capacitor C3. Like the first embodiment shown in FIG. 3, the ring trip circuit of FIG. 4 is a monostable multivibrator.

While the invention has been described in connection with the preferred embodiments, it will be understood that modifications within the principle outlined above will be evident to those skilled in the art. Thus, the invention is not limited to the preferred embodiments, but is intended to encompass such modifications.

What is claimed is:

1. A ring trip detector comprising:
    a voltage difference detector having first and second inputs, for supplying an off-hook signal upon detection of a voltage difference; and
    a switch extending between the first and second inputs of the voltage difference detector.

2. A ring trip detector comprising:
    a sensing resistor;
    a voltage difference detector, for supplying an off-hook signal upon detection of a voltage difference across the sensing resistor; and
    a switch extending in parallel with the sensing resistor to decrease the voltage difference across the sensing resistor when current begins to flow through the sensing resistor.

3. A ring trip detector according to claim 1, wherein:
    the ring trip detector detects when a telephone current starts to flow to a telephone set,
    the ring trip detector has a pulse generating mechanism for generating a pulse only when telephone current starts to flow to the telephone set, and
    the switch is a monostable switch triggered by the pulse, the switch having a stable open state and closing when the pulse is received.

4. A ring trip detector according to claim 1, wherein:
    the ring trip detector detects when a telephone current starts to flow through a sensing resistor having first and second ends;
    the ring trip detector has a differentiator mechanism having two inputs respectively connected to the first and second ends of the sensing resistor, the differentiator mechanism having an output and generating a pulse at the output when current starts to flow through the sensing resistor; and
    the switch has a trigger connected to the output of the differentiator mechanism for closing the switch when the pulse is generated.

5. A ring trip detector according to claim 4, wherein the differentiator mechanism comprises:

a resistor and a capacitor connected in series between the first end of the sensing resistor and the trigger of the switch; and a resistor connected between the second input of the voltage difference detector and the trigger of the switch.

6. A ring trip detector according to claim 4, wherein the ring trip detector has an integrator mechanism connected in series with the differentiator mechanism, between the output of the differentiator and the trigger of the switch.

7. A ring trip detector, comprising:

a voltage difference detector having first and second inputs, for supplying an off-hook signal upon detection of a voltage difference; and a switch extending between the first and second inputs of the voltage difference detector, wherein:

the ring trip detector detects when a telephone current starts to flow through a sensing resistor having first and second ends and to a telephone set, the ring trip detector has a differentiator/integrator mechanism having two inputs respectively connected to the first and second ends of the sensing resistor, the differentiator/integrator mechanism having an output and generating a pulse at the output when current starts to flow through the sensing resistor, and the switch has a trigger connected to the output of the differentiator/integrator mechanism for closing the switch when the pulse is generated.

8. A ring trip detector according to claim 7, wherein the differentiator/integrator mechanism comprises:

a resistor and a capacitor connected in parallel between the trigger of the switch and the second input of the voltage difference detector;

a diode having first and second ends with the first end connected to the trigger of the switch;

a resistor connected between the second end of the diode and the second input of the voltage difference detector; and a resistor and a capacitor connected in series between the first end of the sensing resistor and the second end of the diode.

9. A ring trip detector according to claim 1, wherein the voltage difference detector comprises:

a comparator having first and second inputs; and a pair of R-C alternating current filtering elements, each connected to one input of the comparator and one input of the voltage difference detector.

10. A ring trip detector comprising:

a voltage difference detector having first and second inputs, for supplying an off-hook signal upon detection of a voltage difference; and a switch extending between the first and second inputs of the voltage difference detector, the switch including a transistor selectively allowing current to flow from a first to a second end thereof.

11. A ring trip detector for detecting when a telephone current starts to flow through a sensing resistor having first and second ends and to a telephone set, comprising:

a voltage difference detector having first and second inputs for supplying an off-hook signal upon detection of a voltage difference;

a transistor having a trigger and allowing current to flow from a first to a second end thereof when a pulse is received at the trigger, the first and second ends of the transistor being connected respectively to the first and second inputs of the voltage difference detector; and a differentiator mechanism having inputs connected to the first and second ends of the sensing resistor, the differentiator mechanism having an output and generating a pulse at the output when current starts to flow through the sensing resistor, the differentiator mechanism comprising:

a resistor and a capacitor connected in series between the first end of the sensing resistor and the trigger of the switch, and a resistor connected between the second input of the voltage difference detector and the trigger of the switch.

12. A ring trip detector according to claim 11, wherein the voltage difference detector comprises:

a comparator having first and second inputs; and a pair of R-C filtering elements, each to connected one input of the comparator and one input of the voltage difference detector.

13. A ring trip detector for detecting when a telephone current starts to flow through a sensing resistor having first and second ends and to a telephone set, comprising:

a voltage difference detector having first and second inputs for supplying an off-hook signal upon detection of a voltage difference;

a transistor having a trigger and allowing current to flow from a first to a second end thereof when a pulse is received at the trigger, the first and second ends of the transistor being connected respectively to the first and second inputs of the voltage difference detector; and a differentiator/integrator mechanism having inputs connected to the first and second ends of the sensing resistor, the differentiator/integrator mechanism having an output and generating a pulse at the output when current starts to flow through the sensing resistor, the differentiator/integrator mechanism comprising:

a resistor and a capacitor connected in parallel between the trigger of the switch and the second input of the voltage difference detector;

a diode having first and second ends with the first end connected to the trigger of the switch;

a resistor connected between the second end of the diode and the second input of the voltage difference detector; and a resistor and a capacitor connected in series between the first end of the sensing resistor and the second end of the diode.

14. A ring trip detector according to claim 13, wherein the voltage difference detector comprises:

a comparator having first and second inputs; and a pair of R-C alternating current filtering elements, each connected to one input of the comparator and one input of the voltage difference detector.

* * * * *